Jan. 16, 1968  G. R. HUBBARD  3,363,516
HYDRAULIC SYSTEM AND VALVE ASSEMBLY THEREFOR
Filed Jan. 3, 1966  2 Sheets-Sheet 2
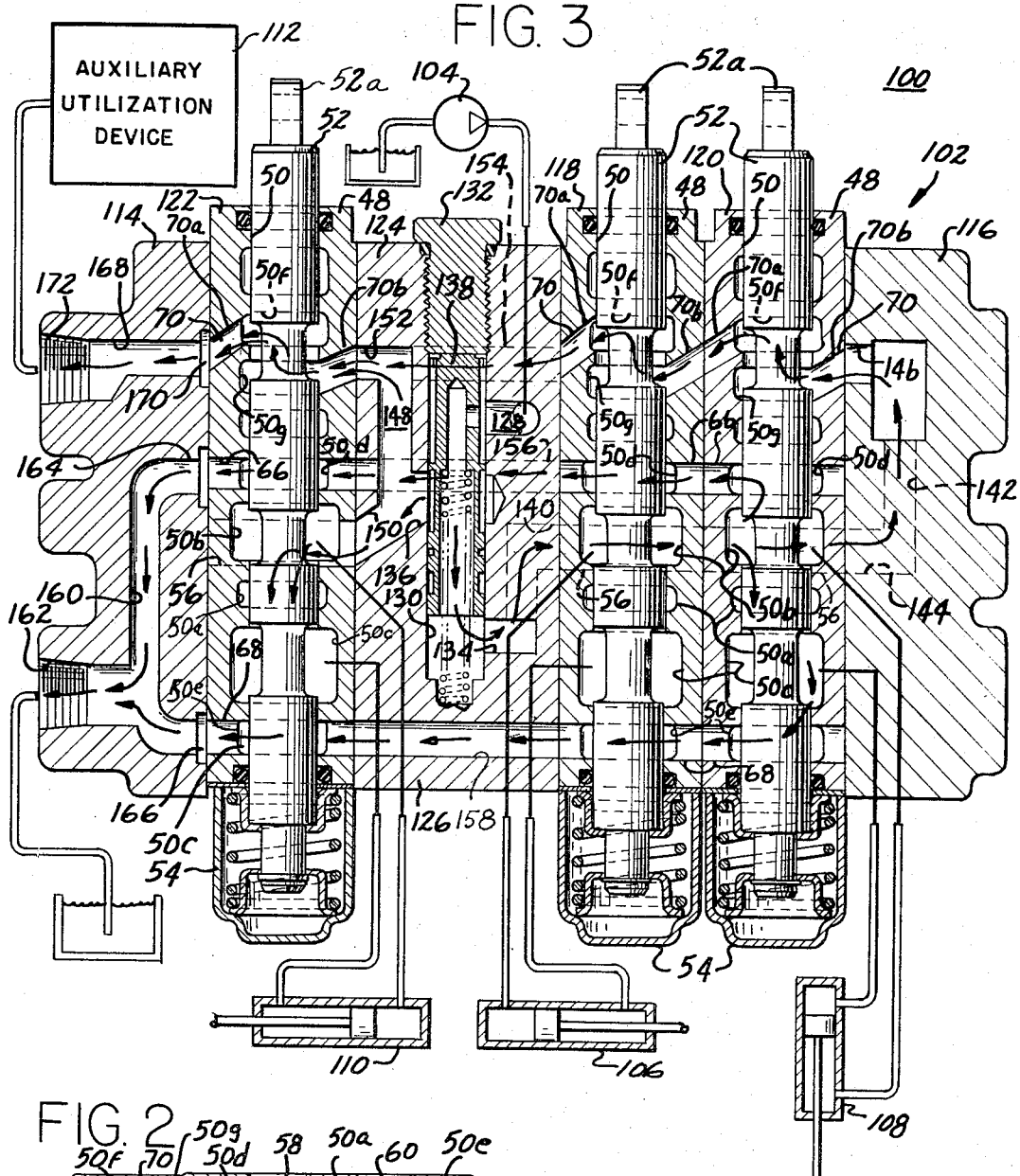
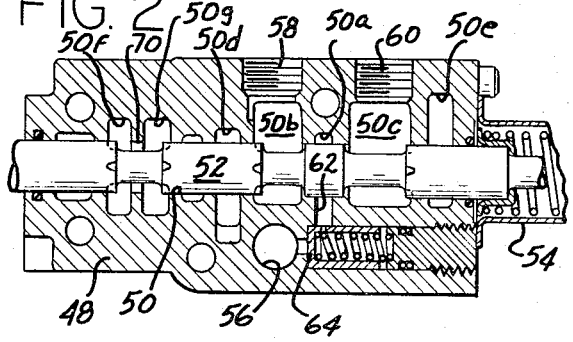
INVENTOR
GLENN R. HUBBARD
BY Mason, Kolehmainen,
Rathburn & Wyss
ATTORNEYS United States Patent Office 3,363,516
Patented Jan. 16, 1968

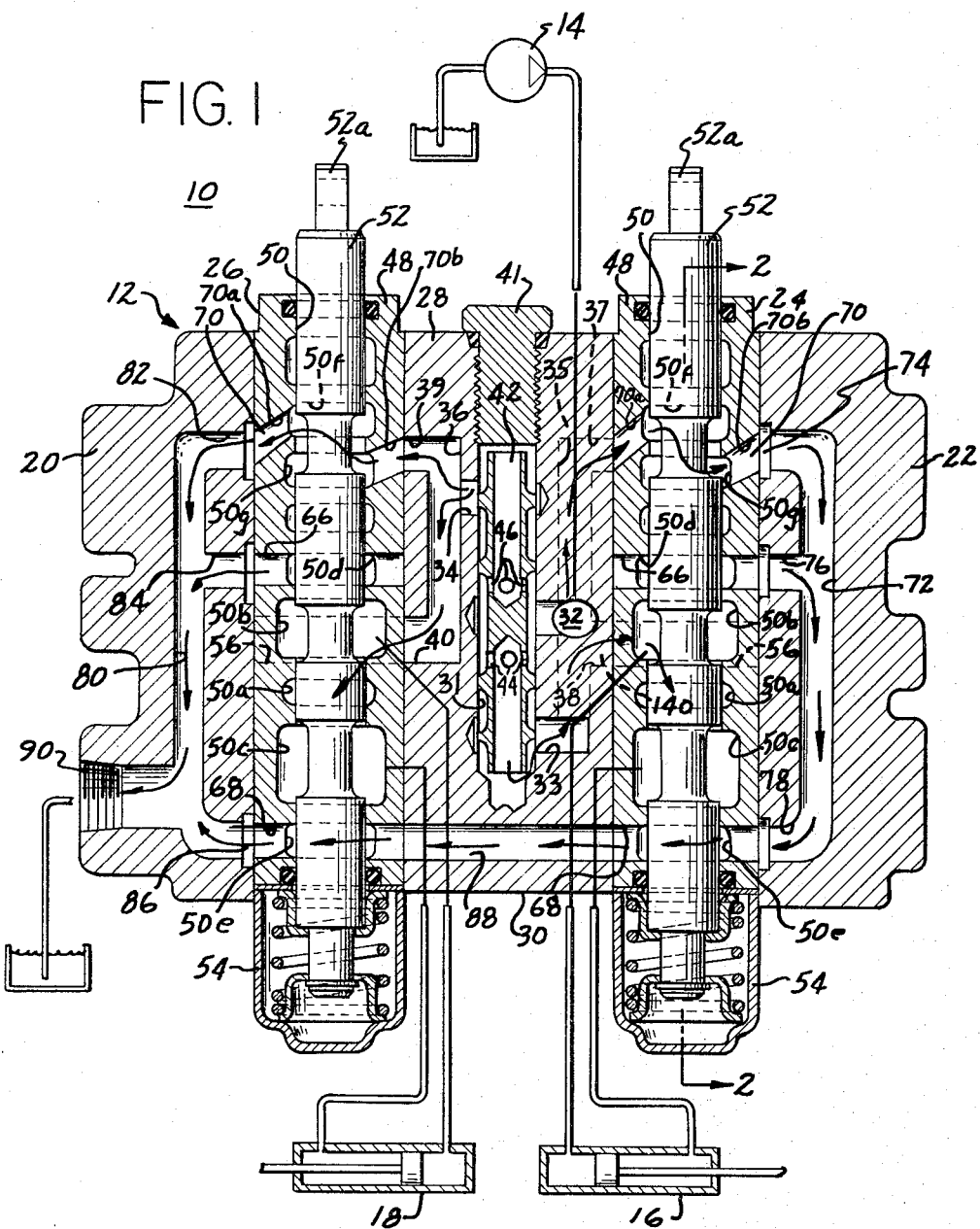

3,363,516
HYDRAULIC SYSTEM AND VALVE
ASSEMBLY THEREFOR
Glenn R. Hubbard, Racine, Wis., assignor to Webster Electric Company, Inc., Racine, Wis., a corporation of Delaware
Filed Jan. 3, 1966, Ser. No. 518,217
8 Claims. (Cl. 91—414)

ABSTRACT OF THE DISCLOSURE

A stacked valve arrangement includes a flow divider sandwiched between a pair of spool valves. The flow divider receives fluid from a pump or other source and divides the fluid into first and second flows which may be proportional flows or constant and excess flows. The first and second flows are supplied to the inlets of the spool valves at interfacing surfaces of the divider valve and the spool valves, and each flow may travel to one or more spool valves. In one embodiment, the first flow is recombined with the second flow when the spool valve or valves receiving the first flow are in their neutral positions and their bypass passages are open.

---

The present invention relates to hydraulic apparatus and more particularly to novel apparatus for controlling the flow of fluid from a fluid source to a plurality of fluid utilization devices.

Many known hydraulic systems include several fluid motors for performing several different functions. For example, motor vehicles such as industrial and farm vehicles include hydraulic systems having a plurality of hydraulic motors for driving and moving various attachments and other equipment. Commonly a plurality of manually operated valves, one for each motor, are included in the system for selectively channeling fluid to the motors in order to operate the equipment. The valves may be of the spool type and are frequently arranged in a valve stack into which the fluid flows from one or more pumps driven by the engine of the vehicle.

In many systems it is desirable to achieve a degree of versatility in the operation of several fluid motors. For example, it may be desirable to operate more than one motor simultaneously at the same speed or at a predetermined speed differential. Furthermore, it may be desirable to regulate the speed of operation of one motor independently of the condition of the rest of the system. It may also be desired to operate one motor of the system at a high speed under certain conditions.

Systems including a single fluid source and a valve stack for controlling a plurality of motors have been used in the past. Although known systems of this type are simple and relatively economical, they are subject to the difficulty that if any one valve in the stack is operated, the flow of fluid to the other valves is affected thereby. If the inlets of the valves are connected in parallel, the operation of the system is unsatisfactory because the speed of operation of any one motor depends upon the condition of the rest of the system, and in particular upon whether other motors in the system are operating. If one or more of the valves are connected in series, then operation of the valve cuts off the flow of fluid to all of the downstream valves.

To overcome the difficulties encountered in these simple systems, more complicated arrangements have been developed. These arrangements may include several pumps and several different combinations of valves. However, the complexity of such arrangements leads to high expense, inefficiency and other problems.

Accordingly, it is an object of the present invention to provide an improved and simplified hydraulic system of great versatility for controlling the flow of fluid to a plurality of fluid utilization devices or fluid motors.

Another object is to provide an improved system capable of simultaneously supplying fluid to more than one fluid motor from a single fluid source and wherein operation of one motor does not interfere with the operation of other motors.

It is still another object to provide an improved hydraulic system in which fluid from a source may simultaneously be used to operate more than one motor in any predetermined proportion or amount.

A further object is to provide an improved hydraulic system wherein the speed of operation of one motor is not affected by the condition of the remainder of the system.

It is yet another object to provide a novel arrangement of valves for controlling fluid flow to a plurality of utilization devices.

It is still another object of the present invention to provide a novel and improved stack valve assembly.

A further object is to provide an improved hydraulic system for high efficiency wherein more than one motor may be operated simultaneously, or alternatively a single motor may be operated at a high speed.

Briefly, one embodiment of a hydraulic system in accordance with the invention may comprise a hydraulic pump for supplying fluid to a pair of fluid motors. In order to control the flow of fluid to the two motors, there is provided a novel valve assembly, which in accordance with the invention may be in a single valve stack whereby a convenient and compact arrangement is obtained.

In accordance with a feature of the invention, the flow from the pump is divided into first and second flows by means of a flow dividing valve included in the stack. A proportional flow dividing valve is used to divide the flow into first and second flows of equal flow velocities. If desired, any other proportion could be used, or another type of flow divider could be used to provide a constant first flow, the second flow constituting the excess.

The first and second flows are channeled respectively to the inlet passages of a pair of spool valves, each connected to control the operation of one of the motors. Each spool valve includes a bypass communicating with the inlet passage and also includes an outlet passage connected to the motor to be controlled. When the valve is in a neutral position, the flow entering the inlet passage travels through the bypass and is discharged to tank. If one of the valves is moved to an operating position, its bypass is blocked and fluid flows from the inlet passage to the corresponding motor. Operation of one valve thus channels one of the two flows from the flow divider to the corresponding motor, but this does not affect the other flow, which is still available to the other valve.

The use of the flow divided to divide the flow from the pump assures that a predetermined flow is continuously available for operation of each motor. Thus, in accordance with the present invention, it is conveniently possible to achieve simultaneous operation of two motors at the same speed, or at any predetermined speed differential as determined by the type of flow divider used in the system. The relative speed of operation of the two motors does not depend on the loads on the motors, because of the provision of the flow divider in the stack. Furthermore, the speed of operation of each motor depends only upon the quantity of fluid delivered by the pump, and is not affected by operation of the other motors.

An alternative embodiment of the invention may comprise a system including a pump and three fluid motors as well as an auxiliary fluid utilization device. To control the flow of fluid to the motors and auxiliary device, another form of valve arrangement may be employed, including a flow divider providing a constant flow velocity first flow and a second flow constituting the excess flow from the pump.

The first flow is directed to the inlet passages of a first pair of four-way spool valves connected to control two of the three motors. The inlets of these valves are connected in parallel to receive the first or constant flow from the flow divider. A third valve is connected to control the flow of fluid to the third motor, and includes an inlet passage receiving the second or excess flow from flow divider. Each spool valve includes a bypass communicating with the inlet passage, the bypass being open when the valve is in the neutral position and blocked when the valve is in an operating position. As regards the first pair of spool valves, the bypasses of these valves communicate with one another so that if either valve is in the operating position, the entire bypass flow from the first pair of valves is blocked.

In accordance with a feature of the invention, the bypass flow from the first pair of valves is combined with the second flow from the flow divider, and conducted to the inlet passage of the third valve. Thus, in addition to the advantages obtained with the first discussed embodiment of the invention, further advantages are realized. Specifically, when both of the first pair of valves are in the neutral position, and the first two motors are not operating, the entire pump flow is recombined and channeled to the third valve, and the third motor can therefore be operated at a high speed. Furthermore, the use of the constant flow type of flow divider makes it possible to regulate the speed of operation of the first two motors independently of the speed of the pump, and also independently of the condition of the third valve.

The bypass from the third valve is open when the valve is in the neutral position. The bypass flow from this valve is made up of the second flow, or of the entire flow of the pump when all of the three spool valves are in the neutral position, and furthermore, this flow is at a pressure nearly as great as the pump pressure, since it has only been passed through the valve stack. In accordance with a further feature of the invention, this flow may be used to power the auxiliary utilization device, which may comprise any desired type of hydraulic equipment.

The above and other objects and advantages of the present invention will appear from the following description of illustrative embodiments of the invention, in the course of which reference is made to the accompanying drawings in which:

FIG. 1 is a partly diagrammatic illustration of a hydraulic system embodying features of the present invention wherein there is included a sectional view of a novel valve assembly constructed in accordance with the invention;

FIG. 2 is a sectional view on a reduced scale of the valve assembly of the hydraulic system of FIG. 1 taken along the line 2—2 of FIG. 1; and FIG. 3 is a partly diagrammatic illustration of a hydraulic system comprising an alternative embodiment of the invention wherein there is included a sectional view of an alternative valve assembly embodying features of the invention.

Referring now to the drawings, and initially to FIG. 1, there is illustrated a hydraulic system generally designated as 10 including a valve assembly generally designated as 12, both embodying features of the present invention. In this embodiment of the invention, the hydraulic system 10 comprises a hydraulic system associated with a motor vehicle and includes a pump 14 for supplying pressurized fluid to the valve assembly 12, as well as a pair of double acting or two directional fluid motors 16 and 18 adapted to be supplied with fluid from the valve assembly 12 as hereinafter described. Although the source of pressurized fluid is the pump 14, it should be understood that any other source of fluid could be utilized.

The hydraulic system illustrated in FIG. 1 is used to control the height of a pair of stripper heads associated with a vehicle for picking cotton. Accordingly, the motors 16 and 18 are each connected in known fashion to raise and lower one of the two stripper heads.

The valve assembly 12 comprises a valve stack including a pair of end sections 20 and 22 as well as a pair of four-way spool valves 24 and 26, each connected to control one of the fluid motors 16 and 18. In accordance with a feature of the invention, and in order to achieve improved control over the operation of the motors 16 and 18, the valve assembly 12 includes a flow divider valve 28 serving to divide the flow from the pump 14 into first and second flows channeled respectively to the two spool valves 24 and 26. Thus, in accordance with the invention, a regulated flow is made available to operate each of the two motors 16 and 18.

In order to make it possible to operate the motors 16 and 18 with equal amounts of fluid whereby the stripper heads may be raised and lowered at the same speed, the flow divider valve 28 is designed to provide first and second flows of fluid of the same flow velocity. If it is desired to operate the motors 16 and 18 at any other predetermined speed differential, the flow divider valve 28 can be designed to divide the flow of pump 14 into any desired proportions. Furthermore, the use of the flow divider valve 28 serves to isolate the valve 24 and motor 16 from the valve 26 and motor 18 so that the speed of operation of each motor is independent of the condition of the other motor and valve.

Referring now to the construction of the flow divider valve 28, the valve includes a valve body 30 of a shape suitable for insertion in the stack valve assembly 12. The body 30 includes a valve bore 31 closed at one end by means of a plug 41. Communicating with the valve bore 31 is an inlet passage 32 opening to the exterior of the valve body 30, as well as first and second discharge passages 33 and 34. The discharge passages communicate respectively with elongated passages 35 and 36 formed in the body 30 of the flow divider valve 28. The passage 35 leads to a pair of discharge openings 37 and 38 in one side wall of the body 30, while the passage 36 leads to discharge openings 39 and 40 in the other side wall.

A valve member 42 is slidably received within the valve bore 31, and is provided with first and second series of openings 44 and 46, the openings 44 and 46 being of the same size, so as to divide the flow from the pump 14 into first and second flows of equal flow velocity discharged from the valve body 30 through the first and second discharge passages 38 and 40. It will readily be understood by those skilled in the art that if it is desired to alter the proportions of the first and second flow, the relative sizes of the openings 44 and 46 may be changed to achieve any desired proportions.

The four way spool valves 24 and 26 (FIGS. 1 and 2) are identical in construction, and similar reference numbers are employed to designate corresponding portions of each valve. Each valve includes a valve body 48 in which is defined a valve bore 50. A valve member or spool 52 is slidably received in the bore, and includes an accessible operating portion 52a for connection to a hand lever or other control for moving the spool 52 upwardly or downwardly between two motor operating positions. Attached to the underside of the valve body is a centering device 54 for normally holding the valve spool 52 in an illustrated central neutral position.

The valve body 48 includes an inlet passage 56 extending across the valve body, but not intersecting the valve bore 50. Along the valve bore is disposed an inlet chamber 50a flanked by a pair of outlet chambers 50b and 50c, each communicating with one of a pair of discharge or motor ports 58 and 60 (FIG. 2) adapted to be connected to the motor to be controlled. The inlet passage 56 communicates with the inlet chamber 50a via a passageway 62 in which is disposed a check valve 64. The valve body 48 is also intersected by a pair of return or tank passages 66 and 68, each communicating with one of a pair of return chambers 50d and 50e along the valve bore 50.

In the illustrated neutral condition of the valve spool 52, the inlet chamber is blocked and no fluid flows through the inlet passage 56. When the valve spool is moved to one of the two operating positions, the inlet chamber 50a communicates through one of the outlet chambers 50b or 50c with one side of the motor, and fluid from the other side of the motor returns through the other outlet chamber and enters one of the pair of return chambers 50d or 50e.

The valve body 48 also includes a bypass passageway 70 including legs 70a and 70b, one on either side of the bore 50, and each communicating with one of two spaced bypass chambers 50f and 50g. In the illustrated neutral position of the valve spool 52, the bypass is open and fluid can therefore flow through the bypass. When the valve spool 52 is moved to one of the operating positions, the bypass 70 is blocked by the spool 52, which isolates the chambers 50f and 50g.

In order to channel the first flow of fluid from the flow divider 28 to the valve 24, the discharge openings 37 and 38 of the flow divider valve 28 register respectively with the bypass 70 and with the inlet passage 56 of the valve 24. When the valve is in a neutral position, this first flow of fluid travels through the bypass 70. When the valve is in an operating position, the bypass 70 is blocked and the first flow of fluid travels through the inlet chamber 58 and to the motor 16. Similarly, the discharge openings 39 and 40 of the flow divider register respectively with the bypass 70 and inlet passage 56 of the valve 26, whereby the second flow of fluid is made available to this valve for operation of the motor 18.

In the embodiment of the invention illustrated in FIG. 1, the bypass flows from the valves 24 and 26 are discharged to tank. Thus the end section 22 includes an elongated passage 72 having openings 74, 76 and 78 along its inner wall, these openings registering respectively with the bypass 70, the tank passage 66, and the tank passage 68 of the valve 24. Thus the bypass flow from the valve 24, as well as the return flow from the motor 16, is conducted to the passageway 72 in the end section 22. Similarly, the end section 20 includes an elongated passage 80 communicating with openings 82, 84 and 86, which openings register respectively with the bypass 70, the tank passage 66, and the tank passage 68 of the valve 26. Thus the elongated passage 80 receives not only the bypass flow from the valve 26, but also the return flow from the motor 18.

The two passages 80 and 82 are in communication by means of a passage composed of the tank passages 68 of the two valves 24 and 26 as well as an additional passage 88 extending between the side walls of the body 30 of the flow divider 28, and registering with the passages 68. In order to discharge the bypass flows and the return flows from the valves 24 and 26, the end section 20 includes a discharge port 90 connected in known fashion to tank or to the inlet of the system fluid source.

Turning now to the operation of the hydraulic system 10 including the novel valve arrangement 12, the flow divider valve 28 divides the flow of fluid from the fluid source 14 into first and second flows having equal flow velocities. When the spool valves 24 and 26 are in their illustrated neutral positions the first and second flows of fluid pass through the bypasses 70 of the spool valves 24 and 26 and into the end section passages 72 and 80 respectively. This bypassed fluid is discharged to tank through the discharge port 90.

It may be desired simultaneously to operate the motors 16 and 18 in order, for example, to simultaneously raise or lower the stripper heads of the cotton picking vehicle. In order to connect the motors 16 and 18 to receive the first and second flows of fluid respectively, the spool valve members 52 of the valves 24 and 26 are moved to one of the two operating positions. As a result of this movement, the spools 52 block the bypasses 70 of the valves 24 and 26, and simultaneously conduct the first and second flows of fluid to the motors. At the same time, fluid is returned from the motors and enters the passageways 72 and 80 in the end sections 22 and 20 from which passages it is discharged to tank through the discharge port 90.

It should be appreciated that due to the inclusion of the flow dividing valve 28 in the valve assembly 12, it is possible to provide the motors 16 and 18 with fluid at the same flow velocity. Accordingly, the stripper heads or other equipment powered by the motors 16 and 18 will move simultaneously and at the same speed. As noted above, if desired, any predetermined differential of speeds may be obtained by altering the construction of the valve 28.

If it is desired to operate only the motor 16, the valve spool 52 of the valve 24 is moved to an operating position while the spool of the valve 26 is maintained in the neutral position. The second flow of fluid is bypassed to tank by means of the bypass 70 of the valve 26 and the passageway 80. The bypass 70 of the valve 24 is blocked, and the first flow of fluid flows to the motor 16, the return flow from the motor 16 flowing to tank through the passageway 72, and the passageway 88. The motor 16 operates at a speed determined only by the rate at which fluid is supplied from the fluid source 14, and the speed of the motor 16 is not dependent upon the condition of the valve 26. Thus, if the spool 52 of the valve 26 is moved to an operating position while the motor 16 is operating, the speed of the motor 16 does not change. Thus it can be seen that the valve assembly 12 of the present invention provides an advantageous degree of regulation over the operation of the motors 16 and 18. Specifically, the interposition of the flow divider 28 between the source and the spool valves 24 and 26, the flow divider 28 being included in the valve stack itself, serves to isolate the first and second flows of fluid from one another.

Proceeding now to a description of the apparatus of FIG. 3, there is illustrated a hydraulic system generally designated as 100 comprising an alternative embodiment of the invention and including a novel valve assembly 102. The hydraulic system 100 may comprise a complete hydraulic system of a vehicle for picking cotton, and includes a pump 104 driven by the prime mover of the vehicle for supplying pressurized fluid to the system. The system also includes three hydraulic motors 106, 108 and 110 to which fluid is supplied through the valve assembly 102. The motor 106 powers a variable sheave transmission device and thus controls the ground speed of the vehicle. The motor 108 is used to tilt the vehicle's cotton collecting basket for emptying cotton from the basket. The motor 110 is used to raise and lower the basket between a cotton collecting position and a cotton discharging position.

The system additionally includes an auxiliary fluid utilization device 112 which may comprise any desired hydraulic equipment associated with the vehicle. In the illustrated embodiment, the auxiliary utilization device 112 comprises the hydraulic system 10 illustrated in FIG. 1. Thus, the pump 14 of the system 10 may be omitted, fluid for the system 10 being supplied by the system 100.

In accordance with the invention, the valve assembly 102 comprises a stack valve arrangement including a pair of end sections 114 and 116, three four-way spool valves 118, 120 and 122 for supplying fluid respectively to the three motors 106, 108 and 110, and includes a constant flow type flow divider valve 124 for dividing the flow from the pump 104 into a first flow to the valves 118 and 120, and a second flow to the valve 122. The valve assembly is characterized by a further feature of the invention in that bypassed flow from the valves 118 and 120 is recombined with the second flow from the flow divider 124 and made available to the valve 122 in order that the motor 110 is able to operate at a high speed under some conditions. In addition, the bypass flow from the valve assembly 102, rather than being returned to tank, is made available to operate additional hydraulic equipment, namely the system 10.

The flow divider 124 is of the constant flow type, and provides a constant flow velocity first flow, and a second flow constituting the excess flow from the pump 104. Thus the valve 124 comprises a body 126 having an inlet passage 128 leading to the exterior of the valve assembly 102 to which fluid is supplied from the pump 104. The flow divider additionally includes a bore 130 closed by a plug 132 and intersected by first and second discharge passages 134 and 136, as well as by the inlet 128. Slideably mounted within the bore 130 is a spring-biased valve member 138 effective to divide the flow from the pump 104 into a first flow discharged through the discharge passage 134 and a second flow discharged through the discharge passage 136. As will readily be understood by those skilled in the art, the flow divider 124 is effective to provide the first flow at a constant flow velocity, the second flow comprising the excess.

In order to control the flow of fluid to the three motors 106, 108 and 110, the valve assembly 104 includes the three four-way spool valves 118, 120 and 122. These valves are identical in construction to the valves 24 and 26 described in connection with the apparatus illustrated in FIG. 1. Accordingly, these valves will not again be described in detail, and the same reference numbers are again used to designate corresponding parts. It should be noted that the valves 118 and 120 are mounted in side by side relation. Thus the inlet passages 56 of these two valves are connected together and the valve inlets are in parallel. Furthermore, the bypasses 70 of the two valves are connected together in series so that movement of either valve from a neutral to an operating position causes the bypass flow from both valves to be blocked.

In order to supply the constant flow velocity first flow of fluid from the flow divider 124 to the valves 118 and 120, the body 126 of the flow divider 124 includes a discharge opening 140 communicating with the discharge passage 134 and registering with the inlet passage 56 of the valve 118 and thereby communicating additionally with the inlet passage 56 of the valve 120. Accordingly, the first flow of fluid from the divider 124 is always available to both motors 106 and 108. If either of the valves 118 or 120 is moved to an operating position, the first flow of fluid is available to the corresponding motor, and if both valves are moved to operating positions, the first flow of fluid travels to both motors 106 and 108.

To interconnect the inlet passages 56 and the bypasses 70 of the valves 118 and 120, the end section 116 includes a passageway 142 communicating with openings 144 and 146 in the inner wall of the end section 116, these openings registering respectively with the inlet passage 56 and the bypass 70 of the valve 120. Thus, if both valves 118 and 120 are in the neutral position, the first flow passes through the inlet passages 56 of these valves, through the passage 142 in the end section 116 and through the bypasses 70 of the two valves. If either or both of the two valves are moved to an operating position, the bypass flow is halted since either one or both of the bypasses 70 of the valves 118 and 120 is blocked by the corresponding spool or spools 52.

It should be appreciated that due to the use of the constant flow type flow divider 124, a constant flow of fluid is always available to operate the motors 106 and 108. Accordingly, it is always possible to control the ground speed of the vehicle through operation of the motor 106, and furthermore the motor 106 always operates at substantially the same speed, assuming the motor 108 not to be operating. It will be appreciated that the motors 106 and 108 are normally not operated at the same time, since the basket is tilted by the motor 108 when the vehicle is at a standstill rather than while the vehicle is moving. A further advantage of the illustrated arrangement is that the constant first flow of fluid available to operate the motor 108 assures that the basket is tilted at a uniform rate of speed.

The second or excess flow from the flow divider 124 passes through the discharge passage 136 and into an elongated passage 148 in the body 126 of the flow divider 124. In communication with the passage 148 are a pair of discharge openings 150 and 152 registering respectively with the inlet passage 56 and with the bypass 70 of the valve 122. Accordingly, the second flow is available to the inlet of the valve 122 and may be utilized to operate the motor 110. When the valve operating spool 52 of the valve 122 is in the neutral position, the second flow travels through the open bypass 70 of the valve 122. If the valve 122 is moved to an operating position, the bypass 70 is blocked and the second flow travels to the motor 110.

In accordance with a feature of the present invention, the bypass flow from the valves 118 and 120, rather than being discharged to tank, is combined with the second flow from the flow divider 124 and is made available for operation of the motor 110. Thus the body 126 of the flow divider 124 includes a passage 154 registering with the bypass 70 of valve 118 and joining the passage 148. Accordingly, when the valves 118 and 120 are in the neutral position, and a bypass flow from these valves exists, this flow travels through the passageway 154 and is recombined with the second flow, and the entire flow from the pump 104 is available to the valve 122 and may be used to power the motor 110 in raising and lowering the cotton collecting basket of the cotton picking vehicle. Since the basket is normally raised and lowered when the vehicle is at a standstill, and since the motor 108 is not used to tilt the basket until it is moved completely to the discharge position, it will be appreciated that normally the entire flow from the pump is available to raise and lower the basket. Since the entire flow is available, the basket may be rapidly raised and lowered whereby a saving in time may be realized.

In order to conduct the return flow from the motors 106 and 108 to tank, the tank passages 66 of the valves 118 and 120 communicate with the tank passage 66 of the valve 122 by means of a passageway 156 in the valve body 126 of the flow divider 124. Similarly, the tank passages 68 of the valves 118 and 120 communicate with the tank passage 68 of the valve 122 by way of a passageway 158 in the valve body 126. A tank passage 160 in the end section 114 communicates with a tank discharge port 162, and with a pair of openings 164 and 166 registering respectively with the tank passage 66 and the tank passage 68 of the valve 122. Thus the return flow from the three fluid motors is discharged to tank through the tank discharge port 162.

In accordance with another feature of the invention, the bypass flow from the valve 122, which comprises the entire bypassed flow from the valve assembly 102, is not discharged to tank, but rather is utilized to power further hydraulic equipment. Thus the end section 114 includes a passageway 168 leading from an opening 170 registering with the bypass 70 of the valve 122 to a fluid discharge port 172 adapted to discharge fluid to the auxiliary utilization device 112. It will be appreciated that the fluid discharged from the valve assembly 102 through the port 172 is at a relatively high pressure, having only been bypassed through the valves. Accordingly, this fluid is at a high enough pressure to operate the hydraulic system 10 illustrated in FIG. 1, or other hydraulic apparatus.

Referring now to the operation of the hydraulic system 100 illustrated in FIG. 3, if each of the valves 122, 118 and 120 are in the neutral position, the flow from the pump 104 is divided by the flow divider 124 and flows respectively to the valves 118 and 120, and to the valve 122. The first flow travels to the inlet passages 56 and then through the bypasses 70 of the valves 118 and 120, after which it is recombined with the second flow from the flow divider 124, whereupon the entire flow moves through the bypass 70 of the valve 122 and to the auxiliary utilization device 112.

If one or both of the valves 118 and 120 are moved to an operating position, the first flow is utilized to power one or both of the motors 106 and 108. The second flow, assuming the valve 122 to be in the neutral position, is bypassed and flows to the auxiliary utilization device 112. Thus it should be appreciated that if the vehicle is moving and the motor 106 is being used to regulate the speed of the vehicle, it is nevertheless possible to adjust the height of the cotton stripper heads by means of the hydraulic system 10, and damage to the heads such as might be caused by rocks or other obstructions in the path of the vehicle may be avoided.

Assuming it is desired to empty the cotton carrying basket after bringing the vehicle to a stop, both valves 118 and 120 are in the neutral position. Accordingly, the entire flow of fluid is available to the valve 122, and when this valve is moved to an operating position, the motor 110 is effective rapidly to raise the basket to the cotton discharging position. Thereafter, the valve 122 is moved to a neutral position and the valve 120 is moved to an operating position in order to cause the motor 108 to tilt at a constant rate and to empty the basket.

While the present invention has been described in connection with the details of illustrative embodiments thereof, these details are not intended to be limitative of the invention except insofar as set forth in the accompanying claims. The principles of the invention are applicable to hydraulic systems of many types other than those illustrated and described.

What is claimed as new and desired to be secured by Letters Patent of the United States is:

1. Apparatus for supplying fluid to first and second fluid utilization devices from a fluid source comprising:
   flow dividing means for dividing flow from the fluid source into first and second flows;
   first control means receiving the first flow from the flow dividing means and movable between an operating position wherein the first flow is channeled to the first utilization device and a neutral position wherein the first flow bypasses the first control means;
   second control means receiving the second flow from the flow dividing means and movable between an operating position wherein the second flow is channeled to the second fluid utilization device and a neutral position wherein the second flow bypasses the second control means; and
   means for combining the bypassed flow from the first control means with the second flow from the flow dividing means.

2. Apparatus as defined in claim 1 further comprising an additional utilization device connected to receive the bypassed flow from the second control means.

3. For use in a hydraulic system including a fluid source and first and second fluid motors, a stack valve assembly comprising:
   first and second spool valves each including a body having an inlet passage, a bypass communicating with the inlet passage, a motor port for connection respectively to the first and second motor, and a valve bore intersected by the bypass and by the motor port;
   first and second spools movable respectively in the first and second valve bores, each movable between a neutral position wherein the motor port is blocked and the bypass is open and an operating position wherein the bypass is blocked and the motor port is in communication with the inlet passage; and
   a flow divider sandwiched in the stack between the first and second spool valves, and including a body having an inlet port for connection to the fluid source and having first and second discharge passages registering respectively with the inlet passages of the first and second valves.

4. The stack valve assembly of claim 3 additionally comprising a passageway in the body of the flow divider registering with the bypass of the first valve and communicating with said second discharge passage for combining the first and second flows thereby to make the entire flow available to the second fluid motor when the first spool is in the neutral position.

5. In a hydraulic system, the combination comprising:
   a source of fluid;
   first and second fluid utilization devices;
   a first control valve including a body having an inlet passage, a bypass communicating with the inlet passage, and an outlet passage communicating with the first utilization device;
   a first valve member associated with the first control valve and movable between a neutral position wherein the inlet passage is blocked and an operating position wherein the bypass is blocked and the inlet passage communicates with the outlet passage;
   a second control valve including a body having an inlet passage and an outlet passage communicating with the second utilization device;
   a second valve member for selectively intercommunicating and isolating the inlet and outlet passages of the second control valve;
   a flow divider including a body having an inlet communicating with the fluid source and having first and second discharge passages for dividing fluid from the source into first and second flows of fluid discharged respectively to the inlet passages of the first and second control valves; and
   means defining a passageway communicating with said bypass and with the inlet passage of the second control valve for supplying the first flow to the second valve when the first valve is in the neutral position.

6. The combination of claim 5 additionally comprising an auxiliary utilization device; and an auxiliary outlet passage communicating with the auxiliary device and communicating with the inlet passage of the second control valve when the outlet and inlet of the second control valve are isolated.

7. The combination of claim 5 wherein said first and second control valve bodies and said flow divider body are in stacked relation and include interfacing surfaces whereat said first and second discharge passages register respectively with the inlet passages of said first and second control valves.

8. The combination of claim 7 wherein said flow divider is stacked between said first and said second control valves; and wherein the flow divider body defines said passageway; and wherein said bypass and said passageway register at the interfacing surfaces of the bodies of said first control valve and said flow divider.

References Cited

UNITED STATES PATENTS

| | | | |
|---|---|---|---|
| 2,112,466 | 3/1938 | Maloon | 60—52 |
| 2,737,196 | 3/1956 | Eames | 60—52 X |
| 2,910,085 | 10/1959 | Banker | 137—101 |

EDGAR W. GEOGHEGAN, *Primary Examiner.*